United States Patent [19]

Nakazono

[11] Patent Number: 4,645,676
[45] Date of Patent: Feb. 24, 1987

[54] METHOD OF PRODUCING FILLER ADDED IN FOODS

[76] Inventor: Shuzo Nakazono, 4-2, Arato 3-chome, Chuo-ku, Fukuoka, Japan

[21] Appl. No.: 735,215

[22] Filed: May 17, 1985

[51] Int. Cl.[4] .......................... A23K 1/10; A23L 1/312
[52] U.S. Cl. .................................... 426/417; 426/438; 426/652; 426/656
[58] Field of Search ............... 426/438, 429, 641, 657, 426/646, 417; 260/412.6, 412.8

[56] References Cited

U.S. PATENT DOCUMENTS

| | | | |
|---|---|---|---|
| 2,539,544 | 1/1951 | Levin et al. | 426/429 |
| 3,099,561 | 7/1963 | Thompson | 426/429 |
| 4,259,252 | 3/1981 | Perry et al. | 260/412.6 |

Primary Examiner—Raymond N. Jones
Assistant Examiner—Carolyn Paden
Attorney, Agent, or Firm—Jordan and Hamburg

[57] ABSTRACT

A method is disclosed for producing filler suitable for addition to foods. Raw material comprising skins, meat, internal organs and, bones of animals, are boiled with steam, charged into a cooker which contains a preheated animal or vegetable oil followed by, closing the cooker in an air-tight manner and, heating the raw material while reducing the pressure in the cooker in two stages. The raw material is separated from the oil in a pressure reduced condition and pulverized.

2 Claims, No Drawings

METHOD OF PRODUCING FILLER ADDED IN FOODS

BACKGROUND OF THE INVENTION

Conventionally, the treatment of the meat, the internal organs, the bones of animals is carried out for the purpose of extracting oil from such raw material. For example, U.S. Pat. No. 1,766,032, U.S. Pat. No. 3,288,825 and U.S. Pat. No. 2,875,222 disclose a method comprising heating such raw material after charging it into a cooker and subsequently squeezing the oil from the raw material or a method comprising charging the raw material into a cooker in which the oil of the same kind as the raw material is contained, heating the material by the heat of the oil and squeezing the oil from the raw material.

However, such conventional methods are provided exclusively for the recovery or collecting of oil from the raw material. And the raw material which remains after extracting oil has never been used for any purposes including utilization as a filler or a nutrition agent which can be added to the food product.

This owes to the fact that such raw material, even after the oil extracting operation, conftains a considerable amount of oil or moisture therein and such contained oil is oxidized to make the long-term preservation of the raw material and pulverization impossible.

Accordingly, it is an object of the present invention to provide a method for treating the raw material, and more particularly, treating the raw material per se rather than aiming at the recovery of the oil.

SUMMARY OF THE INVENTION

For achieving the above object, in the present invention, the raw material is processed such that the animal or vegetable oil is heated in the cooker, the raw material preliminarily boiled with steam is fed into the heated oil, the cooker is subjected to two sequential reducing of inner pressures, namely first at a slightly reduced, i.e., slightly sub-atmospheric or "negative", pressure and subsequently at a highly reduced, i.e., highly sub-atmospheric or "negative", pressure, and the oil is extracted from the raw material also in the reduced pressure atmosphere. The raw material thus processed can be easily pulverized, has no odor, tastes good and contains a considerable amount of protein and calcium. Accordingly, the raw material can be added to all kinds of food products as a filler or a nutrition agent.

DETAILED DESCRIPTION OF PREFERRED EMBODIMENTS

The method of the present invention for producing filler added to food is further explained in view of following embodiments.

An animal or vegetable oil is fed into an air-tight cooker having a capacity of 0.5 m³.

Animal oil may be sardine oil, tallow or the grease, while the vegetable oil may be rapeseed oil or corn oil. The amount of animal or vegetable oil charged into the cooker is 900 kg.

Subsequently, pressurized steam is supplied to the jacket portion of the cooker to heat the animal or vegetable oil to a temperature of more than 80° C.

Then, 3000 kg of the raw material is charged into the heated animal or vegetable oil in the cooker.

The raw material comprises the meat, internal organs, skins and bones of animals such as cows, horses or pigs or those of fish.

The raw material is preliminarily boiled with steam before being charged into the cooker.

The juice is also charged into the animal or vegetable oil in the cooker along with the raw material.

Since the raw material is pre-boiled with steam, the tissue of the raw material is softened, and the efficiency of the thermal dehydration is enhanced. Furthermore, the water-soluble protein and gelatin which are contained in the raw material are coagulated, thus facilitating the ensuing oil-removing and pulverizing operations.

After charging the raw material into the cooker in the above manner, the cooker is closed air-tightly, and the raw material is agitated together with the pre-heated animal or vegetable oil in the cooker. For about 30 minutes after charging the raw material in the cooker, the pressure in the cooker is reduced to 10 to 20 mmHg below atmospheric pressure and thereafter the pressure is reduced to 740 to 750 mmHg below atmospheric pressure.

When about 3 hours lapse after charging the raw material into the cooker, the raw material is taken out together with the oil from the bottom of the cooker which is held in a reduced pressure condition of 740~750 mmHg below atmospheric pressure.

Subsequently, the animal or vegetable oil is squeezed from the raw material also under a reduced pressure condition of 740~750 mmHg below atmospheric pressure. The raw material after the above squeezing operation contains only 8% of oil and 6% of moisture. This means that the raw material is processed almost in a powder form.

To recapitulate the method of the present invention, the raw material is preliminarily boiled with steam so that the water-soluble protein and the gelatinous substance are coagulated to some degree.

A raw material is dehydrated to the moisture-content of about 50 to 60%. This dehydrated raw material is subjected to the pressure reducing operation at two stages while heated by the heat of the oil in the cooker. In the first pressure-reducing operation, the water-soluble protein and the gelatinous substance are completely coagulated thus preventing the dissolving and flowing out of the protein and gelatinous substance into the oil. In the ensuing pressure-reducing operation, the pressure is further reduced to render the specific gravity of moisture contained in the tissue of the raw material smaller than that of the animal or vegetable oil.

Accordingly, the moisture and the oil in the tissue of the raw material are displaced providing uniform and fast evaporation of the moisture throughout the raw material. This prevents the protein and the calcium contained in the raw material from carbonizing.

Subsequently, the oil is squeezed from the raw material in the pressure reduced atmosphere so that the oil infiltrated into the raw material in the cooker is separated from air thus preventing the oxidizing of the oil as well as the adhering of the odor to the raw material. Furthermore, the squeezing under the reduced pressure enables the prompt and easy extracting of the oil which is contained in the core of the tissue of the raw material.

The product produced in the above method contains protein and calcium of high quality and exhibits a powdery form.

Furthermore, the product is free from the smell of the oil or unpleasant odor and is low in hygroscopicity. Still furthermore, the product shows low oil content as well as low moisture content so that, even when the product is stored for a long period, the contained oil is not oxidized and does not absorb the moisture in the air.

Accordingly, the product can be used as the filler for any food such as ham or sausage. Furthermore, the product may be used for adding a taste to foods or for adding nutrients such as protein or calcium to foods. When vegetable oil is used as the oil in the cooker, the taste of the vegetable oil is added to the raw material. For example, when the taste of corn is to be added to filler, the corn oil is fed into the cooker.

What we claim is:

1. A method for producing a filler suitable for addition to foods comprising:

preliminary boiling raw material ingredients comprising meat, internal organs, bones, and skins of animals, with steam to soften the tissues of the raw material, charging the said material, after boiling, into an animal or vegetble oil contained in a cooker and preheated to a temperature of more than 80 degrees C., heating said material in said oil in said cooker under a first negative pressure in the range of 10 to 20 mm Hg below atmospheric pressure for a time sufficient to coagulate the water soluble protein and gelatinous substances in the material and to prevent dissolving and out flow of the water soluble protein and gelatinous substances from the material into said oil, then continuing said heating in said cooker under a second negative pressure in the range of 740 to 750 mm Hg below atmospheric pressure for a period of time sufficient to cause the density of moisture in tissues of the material to become lower than the density of the oil, then squeezing the oil from the material, and then pulverizing the oil-squeezed material to produce said filler.

2. A method for producing a filler as in claim 1, wherein said squeezing of oil from the material is carried out at a negative pressure in the range of 740 to 750 mmHg below atmospheric pressure.

* * * * *